Figure 1:
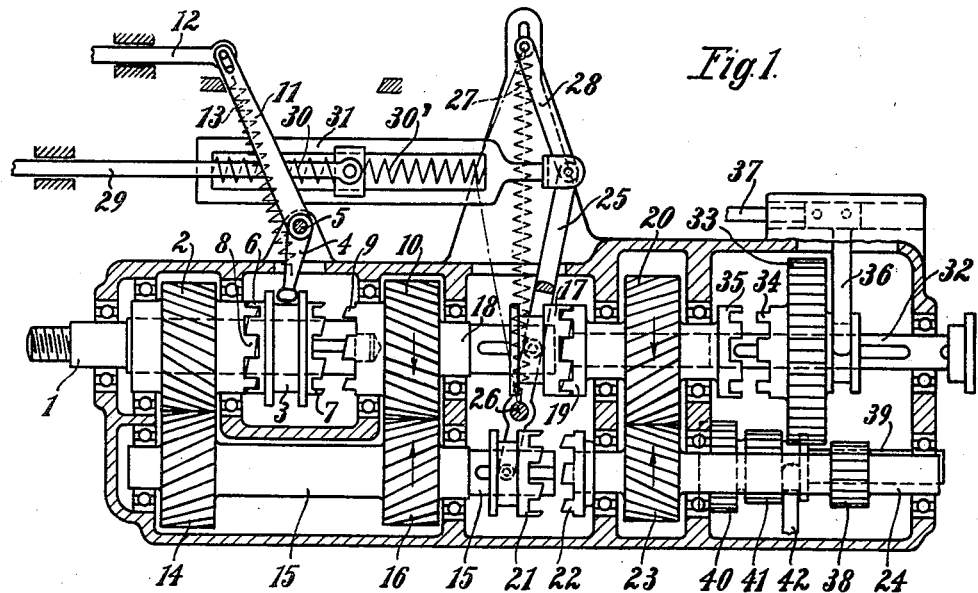

Inventor:
Karl Maybach

Patented Feb. 27, 1934

1,949,168

UNITED STATES PATENT OFFICE 1,949,168

CHANGE SPEED GEAR

Karl Maybach, Friedrichshafen, Germany, assignor to Maybach-Motorenbau G. m. b. H., Friedrichshafen, Germany Application September 22, 1931, Serial No. 564,369
In Germany October 4, 1930

4 Claims. (Cl. 74—57)

My invention relates to change speed gears especially to gears of this kind as used in automobiles and the like. It has special reference to the kind of two speed gears as disclosed in my U. S. Reissue Patent 17,707.

In this patent a special type of two speed gear is disclosed which allows for operation (change of speed) without disconnecting the main clutch situated as usual between the motor and the speed gear, simply by setting the operating member, taking the gas off the motor and giving gas again. This effect is reached by means of a pair of claw couplings which are coupled alternately and the teeth of which have front faces so inclined that the coupling halves coming into contact at first do not engage but rattle past each other until the originally faster half becomes the slower one or vice versa. Two speed gears of this type may be used alone or in connection with any other type of change speed gears.

According to the present invention I combine such a two speed change speed gear with another pair of constantly meshing gears and I provide a claw coupling in each of the two shaft trains. These two claw couplings I provide with means for their alternate operation and also with inclined front faces of their teeth, so that these claw couplings can also be operated without being obliged to disconnect the main friction clutch of the vehicle. Furthermore I add a loose shaft in the main shaft train and a gear splined thereto which is adapted on adequate shifting to engage with an additional gear fixed to the second portion of the countershaft train. Of course there is also a coupling between the new loose shaft and the main shaft of the change speed gear, as the loose shaft now is forming the outgoing shaft.

By this new arrangement it becomes possible to have eight different forward speeds with four pairs of gears only, and it includes the great advantage that from any and every speed it is possible to change into the respective three other speeds without disconnecting the main friction clutch of the vehicle.

Having given a general description of my invention I now want to point it out more in detail referring to the drawing which represents an example embodying my invention.

Both figures are mere diagrams.

Figure 2:
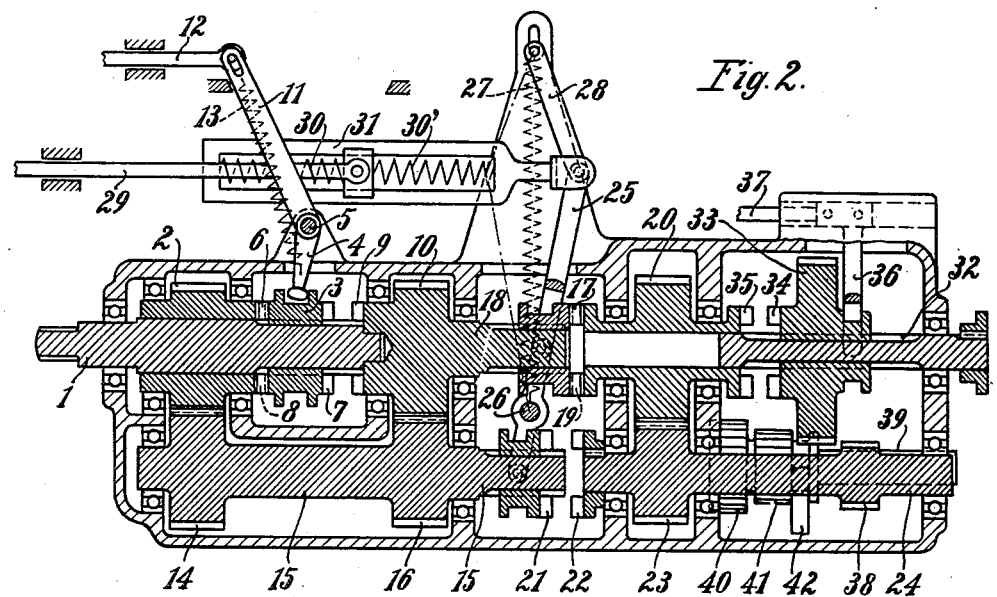

In Fig. 1 the gear case is shown in section allowing a side view on the shafts, gears and their operating devices. Figure 2 is also a vertical longitudinal section but the shafts and gears are shown in section too.

There are two shaft trains, as is best seen from Fig. 2; the first one comprising the portions 1, 18, the shaft portion formed by gear 20 and shaft portion 32; the second one being made up of portions 15 and 24.

Incoming shaft 1 is loosely surrounded by gear 2 and splined to this shaft is sleeve 3 adapted to be shifted longitudinally by means of lever 4 journaled at 5. Sleeve 3 at both ends is provided with bevelled teeth 6 and 7 which cooperate with bevelled teeth 8 and 9, respectively, belonging to gears 2 and 10, respectively. Lever 11 also journaled at 5 can be shifted to its right hand position by means of rod 12. Then spring 13 is tensioned and tends to draw lever 4 together with sleeve 3 to its right hand position also. But as long as teeth 6 and 8 are under load they do not disconnect. When the driver takes the gas off the motor teeth 6 and 8 separate and by means of spring 13 teeth 7 and 9 are brought into contact, but they do not engage because of their bevelled front faces and because of sleeve 7 rotating faster in the direction indicated by the arrow than gear 10. When sleeve 3 has lost in speed of rotation and when gear 10 begins to overrun sleeve 3 then the tension of spring 13 brings teeth 7 and 9 to engagement.

As long as sleeve 3 is in its left hand position it connects gear 2 to shaft 1. Gear 2 is constantly meshing with gear 14 rigidly connected to shaft 15 to which gear 16 is also rigidly connected. Gear 16 meshes constantly with gear 10. Thus in the position represented shaft 1 drives gear 10 over gears 2, 14 and 16.

There is a claw coupling half 17 with teeth having inclined front faces splined to shaft 18 forming the continuation of gear 10. This coupling half co-operates with coupling half 19 rigid on a shaft to which is fixed the gear 20. To the continuation of countershaft 15 coupling half 21 is splined which co-operates with coupling half 22 rigidly connected to gear 23 and to shaft 24. Gear 23 is in constant mesh with gear 20.

Coupling halves 17 and 21 are operated alternately by means of lever 25 journaled at 26. If operating rod 29 is drawn to the left spring 30 is compressed and tends to draw double rod 31 and levers 28 and 25 to their left hand positions also. As long as there is load on teeth 17 and 19 they do not disconnect, but as soon as the driver takes the gas off the motor the tension of spring 30 causes disconnection of teeth 17 and 19 and contact of teeth 21 and 22. But these teeth do not engage because of their bevelled front faces and because of coupling half 22 rotating faster than coupling half 21. When coupling half 21 catches up and begins to overrun coupling half 22 then final engagement between both halves is effected.

Outgoing shaft 32 has a gear 33 splined to it which at its left hand side is provided with an ordinary coupling half 34 co-operating with coupling half 35 which is in rigid connection with gear 20. Gear 33 can be shifted by means of forked arm 36 and striker rod 37; it is represented in its idling position. If shifted to the left coupling halves 34 and 35 engage; if shifted to its right hand position gear 33 meshes with gear 38 rigidly fixed to shaft 24.

There is a stub shaft 39 to which two gears 40 and 41, forming one element, are splined. This gear pair by means of forked rod 42 can be shifted so that gear 40 meshes with gear 33 (in its normal idling position) and gear 41 with gear 38, so that by means of this pair of gears the direction of rotation of outgoing shaft 32 can be reversed.

The different forward speeds of the change speed gear as described are attained as follows:

(a) shaft 1—coupling 6/8—gear 2—gear 14—shaft 15—gear 16—gear 10—shaft 18—coupling 17/19—coupling 35/34—shaft 32;

(b) shaft 1—coupling 6/8—gear 2—gear 14—shaft 15—coupling 21/22—gear 23—gear 20—coupling 35/34—shaft 32;

(c) shaft 1—coupling 6/8—gear 2—gear 14—shaft 15—coupling 21/22—shaft 24—gear 38—gear 33—shaft 32;

(d) shaft 1—coupling 6/8—gear 2—gear 14—shaft 15—gear 16—gear 10—shaft 18—coupling 17/19—gear 20—gear 23—shaft 24—gear 38—gear 33—shaft 32;

(e) shaft 1—coupling 7/9—gear 10—gear 16—shaft 15—coupling 21/22—shaft 24—gear 38—gear 33—shaft 32;

(f) shaft 1—coupling 7/9—gear 10—gear 16—shaft 15—coupling 21/22—gear 23—gear 20—coupling 35/34—shaft 32;

(g) shaft 1—coupling 7/9—shaft 18—coupling 17/19—gear 20—gear 23—shaft 24—gear 38—gear 33—shaft 32;

(h) shaft 1—coupling 7/9—shaft 18—coupling 17/19—coupling 35/34—shaft 32.

The four reverse speeds correspond to the connections c, d, e and g, as before mentioned, with the only difference that gear 38 does not mesh with gear 33 but with gear 41 which is connected to gear 40, then meshing with gear 33.

I do not want to be limited to the details described or shown in the drawing, as many variations will occur to those skilled in the art.

What I claim is:

1. A change speed gear comprising a main shaft train and a countershaft train; the main shaft train including a plurality of axially aligned shaft sections, a free gear carried by the first main shaft portion, a gear fixed to the second main shaft portion, and a gear fixed to a third main shaft portion; the countershaft train comprising a pair of axially aligned shaft portions lying parallel to and opposite the main shaft train, gears fixed to the first countershaft portion one meshing with the gear on the first main shaft portion and another meshing with the gear on the second main shaft portion, a gear fixed on the second countershaft portion meshing with the gear on the third main shaft portion; a double acting clutch operative alternately to connect the free gear on the first main shaft portion to said shaft portion and interconnect the first and second main shaft portions selectively to permit a direct drive through the first and second main shaft portions or from the first main shaft portion through the first shaft portion of the countershaft train, and a pair of simultaneously actuatable clutches one disposed between the second and third main shaft portions and the other between the two countershaft portions operative alternately to provide a drive through the second and third main shaft portions or through the two portions of the countershaft train and cooperative with the double acting clutch to permit the third main shaft portion to be driven directly by the first main shaft portion through the second main shaft portion or indirectly through any two of the three pairs of intermeshing gears of the main and countershaft trains.

2. A change speed gear comprising a main shaft train and a countershaft train; said main shaft train comprising a drive shaft and a driven shaft axially aligned with their ends in spaced relation and two intermediate main shaft portions, a free gear carried by the drive shaft, a gear keyed to and slidable along the driven shaft, and gears fixed one to each of the intermediate main shaft portions; the countershaft train comprising a pair of axially aligned shaft portions lying opposite and parallel to the main shaft train, gears fixed to the first countershaft portion one meshing with the gear on the drive shaft and another meshing with the gear on the first intermediate main shaft portion, gears fixed to the second countershaft portion one meshing with the gear on the second intermediate main shaft portion and another being adapted to mesh with the slidable gear on the driven shaft; a double acting claw clutch operative alternately to connect the free gear on the drive shaft to said shaft and interconnect the drive shaft with the first intermediate main shaft portion selectively to permit a drive direct through the drive shaft and the first intermediate main shaft portion or from the drive shaft through the first countershaft portion, a claw clutch operative to connect the second intermediate main shaft portion to the driven shaft together with means operative simultaneously therewith for disengaging the slidable gear on the driven shaft from mesh with its coacting gear on the second countershaft portion selectively to permit the driven shaft to be driven by direct connection with the second intermediate main shaft portion or by the second countershaft portion through the slidable gear meshing with its coacting gear on said countershaft portion, a pair of simultaneously actuatable claw clutches one disposed between the first and second intermediate main shaft portions and the other between the two countershaft portions operative alternately to provide a drive through the intermediate main shaft portions or through the two portions of the countershaft and cooperative with the double acting clutch and the clutch between the second intermediate shaft portion and the driven shaft selectively to permit the driven shaft to be driven directly by the drive shaft through the main shaft train or indirectly through any two pairs of intermeshing gears of the main and countershaft trains; the teeth of the double acting clutch and the alternately operative clutches between the first and second intermediate main shaft portions and the two countershaft portions having inclined front faces so that when said clutches are selectively actuated to connect the various shaft portions the teeth momentarily rattle past their coacting parts and do not engage until the originally slower of the shaft portions begins to overrun the originally faster of the shaft portions.

3. A change speed gear comprising a main shaft train and a countershaft train; said main shaft train comprising a drive shaft and a driven shaft axially aligned with their ends in spaced relation and two intermediate main shaft portions, a free gear carried by the drive shaft, a gear keyed to and sliding along the driven shaft, and gears fixed one to each of the intermediate main shaft portions; the countershaft train comprising a pair of axially aligned portions lying opposite and parallel to the main shaft train, gears fixed to the first countershaft portion one meshing with the gear on the drive shaft and another meshing with the gear on the first intermediate main shaft portion, gears fixed on the second countershaft portion one meshing with the gear on the second intermediate main shaft portion and another adapted to mesh with the slidable gear on the driven shaft; a double acting clutch operative alternately to connect the free gear on the drive shaft to said shaft and interconnect the drive shaft with the first intermediate main shaft portion selectively to permit a direct drive through the drive shaft and the first intermediate main shaft portion or from the drive shaft through the first countershaft portion, a clutch operative to connect the second intermediate main shaft portion to the driven shaft together with means operative simultaneously therewith for disengaging the slidable gear on the driven shaft from mesh with its coacting gear on the second countershaft portion selectively to permit the driven shaft to be driven by direct connection with the second intermediate main shaft portion or by the second countershaft portion through the slidable gear meshing with its coacting gear on said countershaft portion, a pair of simultaneously actuatable clutches one disposed between the first and second intermediate main shaft portions and the other between the two countershaft portions operative alternately to provide a drive through each intermediate main shaft portions or through the two portions of the countershaft and cooperative with the double acting clutch and the clutch between the second intermediate shaft portion and the driven shaft collectively to permit the driven shaft to be driven directly by the drive shaft through the main shaft train or indirectly through any two pairs of intermeshing gears of the main and countershaft trains; and a reverse mechanism including a stub shaft lying opposite the second shaft portion of the countershaft train having a pair of gears fixed thereto positioned normally to be out of engagement with gears of the main and countershaft trains, said stub shaft being slidable axially so that when the slidable gear on the driven shaft and its coacting gear on the second countershaft portion are out of mesh and offset from each other the stub shaft gears may simultaneously be shifted axially into mesh with one of said gears to bring about a reverse drive between the second countershaft portion and the driven shaft for each of the various driving speeds between the drive shaft and the second countershaft portion selectively obtained through the first three pairs of intermeshing gears of the main and countershaft trains.

4. A change speed gear comprising a main shaft train composed of a plurality of axially aligned shaft sections carrying gears, a countershaft lying opposite and parallel to the main shaft train carrying gears engageable each with a gear of the main shaft train, and clutch means permitting the selective use of the various sets of gears; the main shaft train including a driven shaft portion on which the gear is keyed to slide axially therealong, one of the clutches serving to connect the driven shaft to the adjacent shaft portion of the main shaft train, and means operative simultaneously with said clutch for moving the sliding gear on the driven shaft out of mesh with its coacting gear in the countershaft train; and a reverse mechanism comprising a stub shaft lying opposite the countershaft train having a pair of gears fixed thereto positioned normally to be out of mesh with gears of the main and countershaft trains, said stub shaft being slidable axially so that when the slidable gear on the driven shaft and its coacting countershaft gear are out of mesh and offset from each other the stub shaft gears may simultaneously be shifted axially into mesh each with one of said gears to bring about a reverse drive between the countershaft train and the driven shaft portion of the main shaft train.

KARL MAYBACH.